United States Patent
Cheung

(10) Patent No.: US 10,282,753 B2
(45) Date of Patent: May 7, 2019

(54) GEO-FENCED MARKETPLACE

(71) Applicant: eBay Inc., San Jose, CA (US)

(72) Inventor: Dennis Cheung, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 414 days.

(21) Appl. No.: 14/566,526

(22) Filed: Dec. 10, 2014

(65) Prior Publication Data

US 2016/0171545 A1 Jun. 16, 2016

(51) Int. Cl.
*G06Q 30/00* (2012.01)
*G06Q 30/02* (2012.01)
*H04W 4/021* (2018.01)

(52) U.S. Cl.
CPC ..... *G06Q 30/0261* (2013.01); *G06Q 30/0275* (2013.01); *H04W 4/021* (2013.01)

(58) Field of Classification Search
CPC .......................... G06Q 50/01; G06Q 30/0241
See application file for complete search history.

(56) References Cited

U.S. PATENT DOCUMENTS

| | | |
|---|---|---|
| 2010/0042940 A1 | 2/2010 | Monday et al. |
| 2010/0131363 A1 | 5/2010 | Sievert et al. |
| 2012/0150645 A1 | 6/2012 | Mandyam et al. |
| 2012/0158509 A1* | 6/2012 | Zivkovic ............ G06Q 30/0241 705/14.58 |
| 2012/0323689 A1* | 12/2012 | Metcalf .............. G06Q 30/0241 705/14.58 |
| 2014/0025524 A1* | 1/2014 | Sims .................. G06Q 30/0639 705/26.3 |
| 2014/0057648 A1 | 2/2014 | Lyman et al. |
| 2014/0164118 A1 | 6/2014 | Polachi |
| 2014/0195353 A1* | 7/2014 | Govan ............... G06Q 30/0267 705/14.64 |
| 2015/0142594 A1* | 5/2015 | Lutnick ................ G06Q 20/202 705/21 |
| 2016/0104113 A1* | 4/2016 | Gorlin .............. G06Q 10/08355 705/338 |

FOREIGN PATENT DOCUMENTS

JP    2002247635 A  *  8/2002  ............. G06F 17/60

OTHER PUBLICATIONS

Scandit. The Convergence of the Physical and Digital Marketplace: The Future. (May 29, 2012) Retrieved Dec. 13, 2018 online. https://www.scandit.com/the-convergence-of-the-physical-and-digital-marketplace-the-future/ (Year: 2012).*

* cited by examiner

*Primary Examiner* — James A Reagan
(74) *Attorney, Agent, or Firm* — Schwegman Lundberg & Woessner, P.A.

(57) ABSTRACT

A system comprising a computer-readable storage medium storing at least one program and a computer-implemented method for a geo-fenced zone of commerce are described. Consistent with some embodiments, the method may include subdividing a geographic area, generating corresponding geo-fences, and presenting the corresponding geo-fences as listings in a navigable online marketplace.

20 Claims, 11 Drawing Sheets

US 10,282,753 B2

GEO-FENCED MARKETPLACE

TECHNICAL FIELD

This application relates to data processing. In particular, example embodiments may relate to systems and methods for providing a geo-fenced zone of commerce.

BACKGROUND

A "geo-fence" is a virtual perimeter created around real-world geographic locations. Traditional geo-fence services provide merchants or other businesses with a capability to create a geo-fence around a particular location. When a user enters or exits a perimeter of one of these geo-fences with a location-aware device (e.g., a smartphone), a notification related to the location may be transmitted to the user's device. Such notifications are often used as a marketing tool to entice nearby users to patronize these locations.

BRIEF DESCRIPTION OF THE DRAWINGS

Various ones of the appended drawings merely illustrate example embodiments of the present invention and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure describe systems and methods for provisioning one or more geo-fences around a geographic area, and presenting the geo-fence in a geo-fenced zone of commerce, such as marketplace or retail outlet for example. Consistent with some embodiments, the method may include receiving bids or requests from a user to utilize for a defined period one or more geo-fences for the purpose of identifying recipients of targeted content that may or may not be created by the user submitting the bid or request. The user may specify a geographic location, and demographic attributes corresponding to a desired group of recipients, the demographic attributes including age, gender, a transaction history, a recipient's user profile information, and one or more social actions (e.g., a "like", a "tweet", a status update, a check-in, becoming a follower, pin an interest or the like) performed by the recipient and published as an entry on one or more social networks (e.g., FACEBOOK®, TWITTER®, GOOGLE+®, PINTEREST®, SVPPLY®). For example, a user may specify that targeted content only be delivered to recipients entering into a geographic area if the recipients have "liked" the brand NIKE® on FACEBOOK®. The user may then bid on, lease or purchase the corresponding geo-fence in order to use the geo-fence for a defined period of time to identify recipients to deliver targeted content. Once the recipients enter the geographic area corresponding to the geo-fence, targeted content may be transmitted to a device of the recipient. The targeted content may include advertisements, coupons, rewards, or other incentives that may be created by the user.

Figure 1:
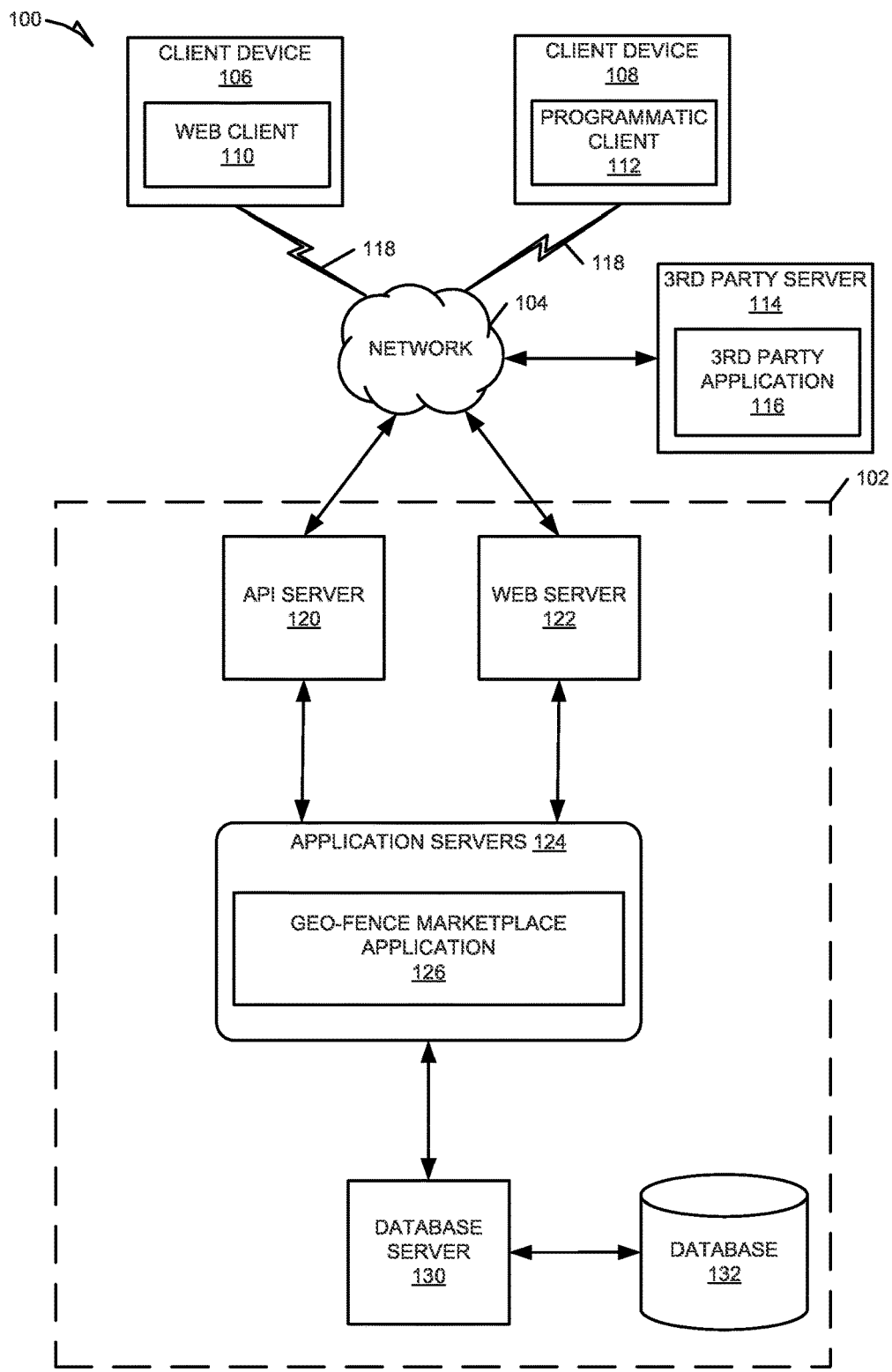
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network. The network system 100 may include a network-based content publisher 102 in communication with client devices 106 and 108, and third party server 114. For example, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client devices 106 and 108). The one or more client devices 106 & 108 may be operated by users that use the network system 100 to exchange data over a communication network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanged within the network system 100 may be dependent upon user-selected functions available through one or more client or user interfaces (UIs). The UIs may be associated with a client device, such as the client device 106 using a web client 110. The web client 110 may be in communication with the network-based content publisher 102 via a web server 122. The UIs may also be associated with the client device 108 using a programmatic client 112, such as a client application in communication with the network-based content publisher 102, or a third party server 114 (e.g., one or more servers or client devices 160 or 108) hosting a third party application 116.

The client devices 106 and 108 may be any of a variety of types of devices. For example, the client devices 106 and 108 may a mobile device such as a smartphone such as an iPhone® or other mobile device running the iOS® operating system, the Android® operating system, a BlackBerry® operating system, the Microsoft® Windows® Phone operating system, Symbian® OS, or webOS®. Consistent with some embodiments, the client devices 106 and 108 may alternatively be a tablet computer, such as an iPad® or other tablet computer running one of the aforementioned operating systems. In some embodiments, the client device 106 and 108 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, or the Sony PlayStation 3®, or other video game system consoles.

The client devices 106 and 108 may interface via a connection 118 with the communication network 104 (e.g., the Internet or wide area network (WAN)). Depending on the form of the client device 106 and 108, any of a variety of types of connections 118 and communication networks 104 may be used. For example, the connection 118 may be Code Division Multiple Access (CDMA) connection, a Global System for Mobile communications (GSM) connection, or other type of cellular connection. Such a connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 118 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client devices 106 and 108. The third party application 116 may have programmatic access to the network-based content publisher 102 via the programmatic interface provided by an application program interface (API) server 120. In some embodiments, the third party application 116 may be associated with a vendor, a merchant, or any organizations that may conduct transactions with or provide services to the users of the client devices 106 and 108. For some example embodiments, the third party application 116 may correspond to a social network (e.g., Facebook®, Twitter®, Google+®, Pinterest®, Svpply®, or the like).

Turning specifically to the network-based content publisher 102, the API server 120 and a web server 122 are coupled to, and provide programmatic and web interfaces respectively to, one or more application servers 124. The application servers 124 may, for example, host a geo-fence marketplace application 126, which may provide a number of marketplace functions and services to users that access the network-based content publisher 102. The geo-fence marketplace application 126, may be configured to generate and provision geo-fences over a geographic area, and to present the geo-fences in a marketplace enabling user to purchase geo-fence services for the purpose of identifying recipients to deliver targeted content. The application servers 124 may be coupled via these interfaces to the communication network 104, for example, via wired or wireless interfaces. The application servers 124 are, in turn, shown to be coupled to one or more database servers 130 that facilitate access to one or more databases 132. In some examples, the application servers 124 can access the databases 132 directly without the need for a database server 130. In some embodiments, the databases 132 may include databases both internal and external to the network-based content publisher 102.

While the geo-fence marketplace application 126 is shown in FIG. 1 to form part of the network-based content publisher 102, it will be appreciated that, in alternative embodiments, the geo-fence marketplace application 126 may form part of a service that is separate and distinct from the network-based content publisher 102. Further, while the system 100 shown in FIG. 1 employs client-server architecture, the present inventive subject matter is, of course, not limited to such an architecture, and could equally well find application in an event-driven, distributed, or peer-to-peer architecture system, for example. The various applications and modules of the application servers 124 may also be implemented as standalone systems or software programs, which do not necessarily have networking capabilities.

Figure 2:
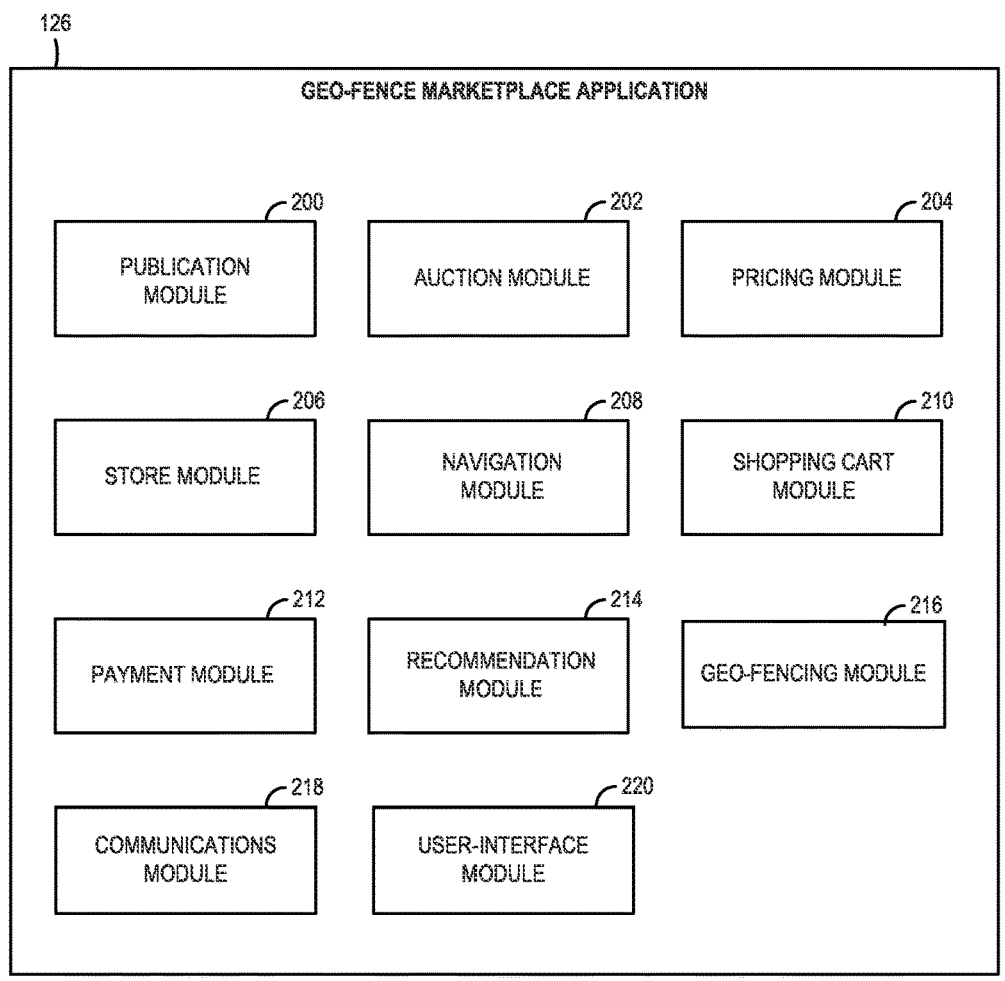
FIG. 2 is a block diagram illustrating an example embodiment of multiple modules forming a geo-fence marketplace application, which is provided as part of the network system of FIG. 1.

FIG. 2 is a block diagram illustrating an example embodiment of multiple modules forming the geo-fence marketplace application 126, which is provided as part of the network system 100 of FIG. 1. The modules of the geo-fence marketplace application 126 may be hosted on dedicated or shared server machines that are communicatively coupled to enable communications between server machines. Each of the modules 200-218 are communicatively coupled (e.g., via appropriate interfaces) to each other and to various data sources, so as to allow information to be passed between the modules 200-218 of the geo-fence marketplace applications 126 or so as to allow the modules 200-218 to share and access common data. The various modules of the geo-fence marketplace application 126 may furthermore access one or more databases 132 via the database servers 130. Further, while the modules of FIG. 2 are discussed in the singular sense, it will be appreciated that in other embodiments multiple modules may be employed.

The geo-fence marketplace application 126 may provide a number of publishing, listing, and price-setting mechanisms whereby a seller may list (or publish information concerning) geo-fences for sale, a buyer can express interest in or indicate a desire to purchase such geo-fence services, and a price can be set for a transaction pertaining to the geo-fence services. To this end, the geo-fence marketplace application 126 is shown to include at least one publication module 200 and one or more auction module 202, which support auction-format listing and price setting mechanisms (e.g., English, Dutch, Vichey, Chinese, Double, Reverse auctions etc.). The auction module 202 may also provide a number of features in support of such auction-format listings, such as a reserve price feature whereby a seller may specify a reserve price in connection with a listing, and a proxy-bidding feature whereby a bidder may invoke automated proxy bidding.

A number of pricing module 204 support fixed-price listing formats (e.g., the traditional classified advertisement-type listing or a catalogue listing) and buyout-type listings. Specifically, buyout-type listings (e.g., including the Buy-it-Now (BIN) technology developed by eBay Inc., of San Jose, Calif.) may be offered in conjunction with auction-format listings, and allow a buyer to purchase gee-fence services, which are also being offered for sale via an auction, for a fixed-price that is typically higher than the starting price of the auction. The pricing module 204 may also provide price calculation capabilities, wherein an initial price for a particular geo-fence may be calculated based on the size, location, and demographic attributes corresponding to the gee-fence. The pricing module 204 may gather and analyze attributes of a geo-fence and determine that the corresponding price of the gee-fence increases in relation to the size and range of the geo-fence. For example, as a geo-fence increases in size, the corresponding initial price of the gee-fence also increases.

Store module 206 may allow sellers to group their product listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based content publisher 102 may be facilitated by one or more navigation module 208. For example, a search module may, inter alia, enable keyword searches of listings published via the content publisher 102. A browser module may allow users via an associated User Interface UI to browse various category, catalogue, inventory, social network, and review data structures within the content publisher 102. Various other navigation modules 208 (e.g., an external search engine) may be provided to supplement the search and browsing modules. Consistent with some embodiments, the results for keyword searches of listings published via the network-based content publisher 102 may be filtered to include only listings corresponding to social network connections of the user (e.g., indicated friends and family).

In one embodiment, an electronic shopping cart module 210 is used to create an electronic shopping cart used by users of the network-based content publisher 102 to add and store products (e.g., goods and services) listed by the store module 206. The electronic shopping cart module 210 may also be used to "check out," meaning a user may purchase products in the electronic shopping cart. The electronic shopping cart module 210 may facilitate the transactions by automatically finding the products in the electronic shopping cart across at least one or all of a predefined set of vendors, a comparison shopping site, an auction site, etc. In various embodiments, the selection criteria for which vendor or vendors to purchase from may include, but is not limited to, criteria such as lowest cost, fastest shipping time, preferred or highest rated vendors or sellers, or any combination thereof.

As illustrated in FIG. 2, the geo-fence marketplace application 126 may include one or more payment module 212 that may provide a number of payment services and functions to users. The payment module 212 may allow users to accumulate value (e.g., in a commercial currency, such as the U.S. dollar, or a proprietary currency, such as "points") in accounts, and then later to redeem the accumulated value for products (e.g., goods or services) that are made available via the payment module 212. For some example embodiments, the payment module 212 generally enables transfer of values (e.g., funds, reward points, etc.) from an account associated with one party (e.g., a sender) to another account associated with another party (e.g., a receiver).

As illustrated in FIG. 2, the geo-fence marketplace application 126 may include one or more recommendation module 214, which may provide recommendation services and functions to users. In some embodiments, the recommendation module 214 may receive requests for recommendations, and, in turn, provide a recommendation to the user based on information contained in the user's corresponding user profile. In some embodiments, the recommendation module 214 may automatically generate and provide a recommendation based on the activity of the user. The recommendations provided by the recommendation module 214 may contain one or more items (e.g., products offered for sale, articles, blogs, movies, social network connections, etc.) that may potentially interest a user. The recommendations may, for example, be based on previous products purchased by the user or a social network connection of the user, a web page viewed by the user, or an item given favorable feedback by the user or a social connection of the user, or location information corresponding to the user.

The geo-fencing module 216 subdivides a geographic area and generates the one or more corresponding geo-fences. Each geo-fence generated by the geo-fencing module 216 is stored in a database (e.g., database 132) and may be presented by the user-interface module 220 in the interactive marketplace. Functions of the goo-fencing module 216 are discussed further in FIG. 4.

The communications module 218 may utilize any one of a number of message delivery networks and platforms to deliver messages to users. For example, the communications module 218 may deliver push notifications (e.g., via a pertinent push notification service), electronic mail (e-mail), instant message (IM), Short Message Service (SMS), text, facsimile, or voice (e.g., voice over IP (VoIP)) messages via the wired (e.g., the Internet), plain old telephone service (POTS), or wireless (e.g., mobile, cellular, WiFi, WiMAX) networks.

Figure 3:
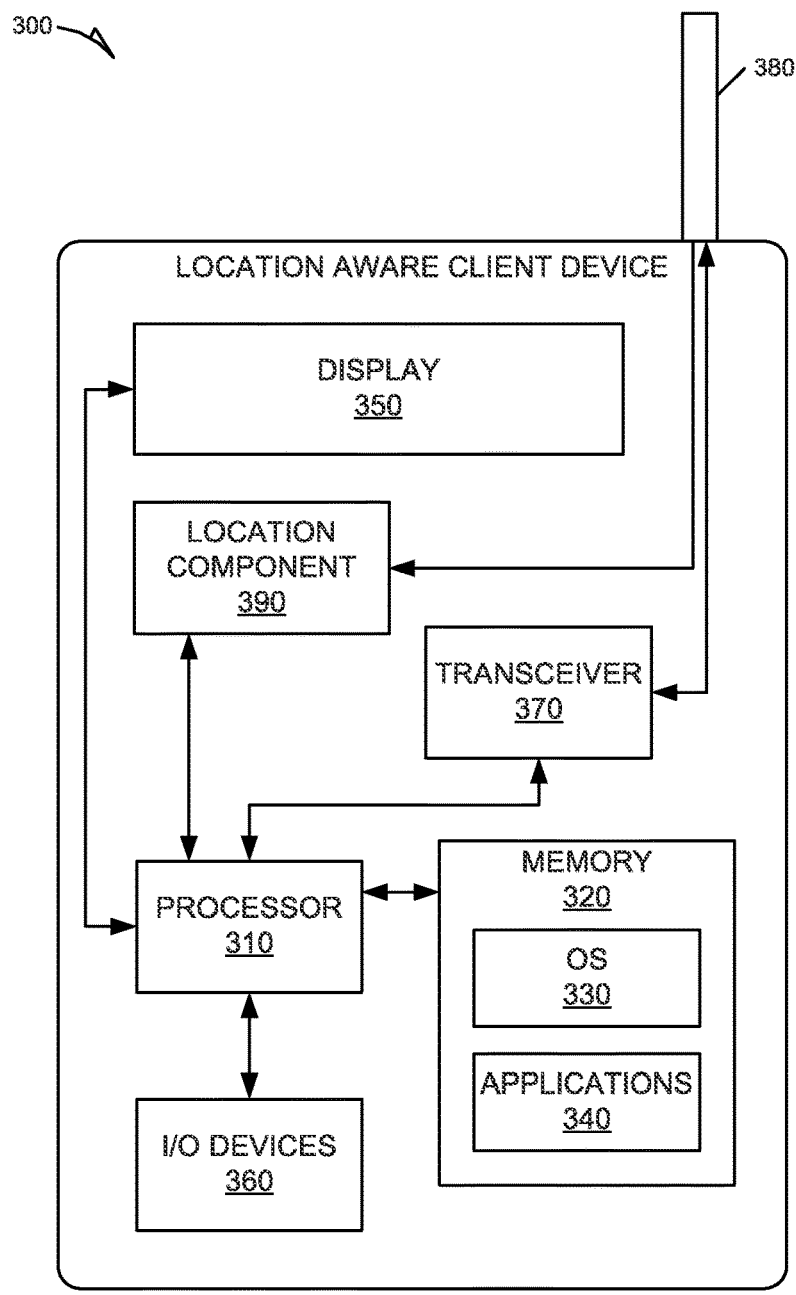
FIG. 3 is a block, diagram illustrating an example mobile device, consistent with some embodiments.

FIG. 3 is a block diagram illustrating a location aware client device 300, which may correspond to client device 106 or client device 108, consistent with some embodiments. The location aware client device 300 may, for example, be a smartphone such as an iPhone® or other mobile device. The location aware client device 300 may also be a tablet computer such as the iPad® or other similar device. The location aware client device 300 may include a processor 310. The processor 310 may be any of a variety of different types of commercially available processors suitable for mobile devices (e.g., an XScale architecture microprocessor, a Microprocessor without Interlocked Pipeline Stages (MIPS) architecture processor, or another type of processor). A memory 320, such as a random access memory (RAM), a Flash memory, or other type of memory, is typically accessible to the processor 310.

The memory 320 may store instructions for execution by the processor 310 for causing the location aware client device 300 to perform specific tasks. For example, the memory 320 may be adapted to store an operating system (OS) 330. Depending on the particular type of the location aware client device 300, the OS 330 may, for example, be the iOS® operating system, the Android® operating system, a BlackBerry® operating system, the Microsoft® Windows® Phone operating system, Symbian® OS, or webOS®. Further, such instructions may relate to operations performed by applications 340 (commonly known as "apps") stored in memory 320. One example of an application 340 is a mobile browser application that displays content, such as a web page or a user interfaces using a browser. The application 340 may also include social applications such as Facebook®, Twitter®, Google+®, Pinterest®, or Svpply® in communication with an applicable third party server 114. The application 340 may also include a mobile marketplace application for viewing, purchasing, and selling geo-fence services through the geo-fence marketplace application 126. The application 340 may also include a mobile location enabled application that may provide location based services (e.g., real-world location check-in) to a user.

The processor 310 may be coupled, either directly or via appropriate intermediary hardware, to a display 350 and to one or more input/output (I/O) devices 360, such as a keypad, a touch panel sensor, a microphone, a speaker, a camera, and the like. Similarly, in some embodiments, the processor 310 may be coupled to a transceiver 370 that interfaces with an antenna 380. The transceiver 370 may be configured to both transmit and receive cellular network signals, wireless data signals, or other types of signals via the antenna 380, depending on the nature of the location aware client device 300. In this manner, the connection 118 with the network 104 may be established.

Consistent with some embodiments, the location aware client device 300 may include a location component 390 for determining a location of the location aware client device 300. In some embodiments, the location component 390 may correspond to a GPS transceiver that may make use of the antenna 380 to communicate GPS signals with a GPS satellite. The location component 390 may also be configured to determine a location of the location aware client device 300 by using an internet protocol (IP) address lookup or by triangulating a position based on nearby mobile communications towers. The location component 390 may be further configured to store a user-defined location in memory 320. In some embodiments, a mobile location enabled application may work in conjunction with the location component 390 and the transceiver 370 to transmit the location of the location aware client device 300 to the application server 124 or third party server 114 via antenna 380 for the purpose of identifying the location of a user operating the location aware client device 300.

Figure 4:
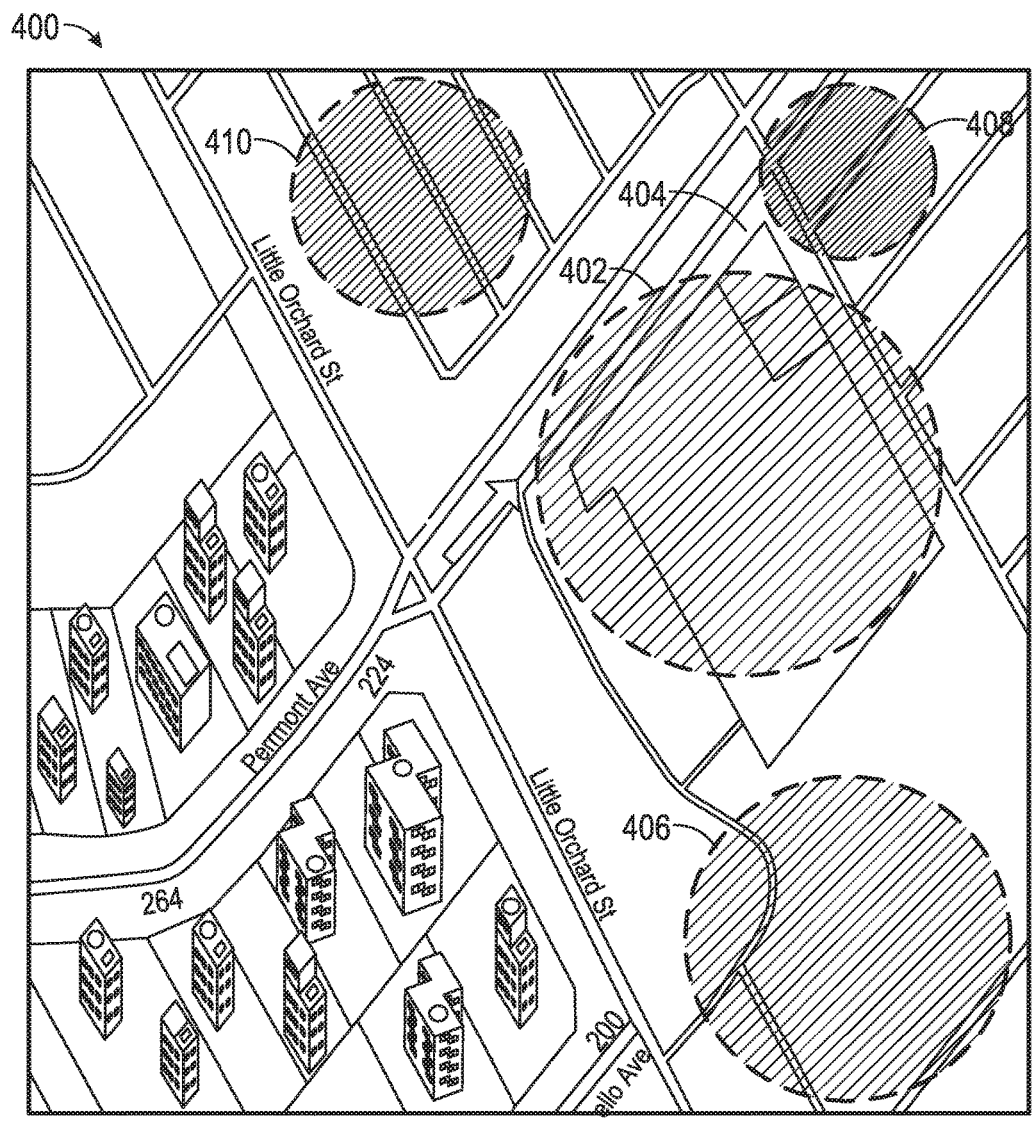
FIG. 4 is an interface diagram depicting a geo-fence provisioning interaction between an application server, and a third party server, consistent with some embodiments.

FIG. 4 is an interaction diagram 400 depicting geo-fence provisioning by the geo-fencing module 216. The geo-fencing module 216 subdivides a geographic area and generates the one or more geo-fences 402, 406, 408, and 410.

Each geo-fence generated by the geo-fencing module 216 is stored in a database (e.g., database 132) and is presented by the user-interface module 220 in the interactive marketplace. Each geo-fence corresponds to a subdivided portion of the geographic area. For example, geo-fence 402 corresponds to geographic area 404.

In some embodiments, the geo-fencing module 216 subdivides a geographic area 404 based on locations of businesses and landmarks distributed over the region, and places a geo-fence over each business and landmark. In other embodiments, the geo-fencing module 216 may obtain social network activity of a plurality of users within a geographic region from one or more social networks. The social network activity may include one or more social actions (e.g., a like, a tweet, a status update, a check-in, becoming a follower, Pin an interest or the like) performed by the user and published as an entry on one or more social networks (e.g., Facebook®, Twitter®, Google+®, Pinterest®, Svpply®). The social network activity is analyzed to identify concentrations of check-in data, a real-world location corresponding to the concentrations of check-in data is identified, and a geo-fence is created for the location. For example, if a plurality of users identify a particular geographic location in their social actions, the geo-fencing module 216 may use the data to identify a particular geographic area 404 as a location for a geo-fence.

The geo-fencing module 216 stores the corresponding social action data in the database 132 for use by the pricing module 204 in setting an initial price for the geo-fence. For example, a geographic area 404 with a higher concentration of social action data corresponding to it may garner a higher initial price for the corresponding geo-fence, whereas a geographic area 404 with few corresponding social actions would be less valuable.

In other embodiments, the geo-fencing module 216 provisions geo-fences based upon user inputs specifying a particular geographic location and demographic information. The user may specify a geographic location through user inputs, as well as demographic attributes corresponding to a desired group of recipients, the demographic attributes including age, gender, a transaction history, a recipient's user profile information, and one or more social actions (e.g., a like, a tweet, a status update, a check-in, becoming a follower, Pin an interest or the like) performed by the recipient and published as an entry on one or more social networks (e.g., Facebook®, Twitter®, Google+®, Pinterest®, Svpply®). The user may select a geographic area 404 by entering an address, cross streets, GPS coordinates, or keywords corresponding to user social actions. Responsive to defining a geographic area 404, the geo-fencing module 216 would then generate a corresponding geo-fence 402.

Figure 5A:
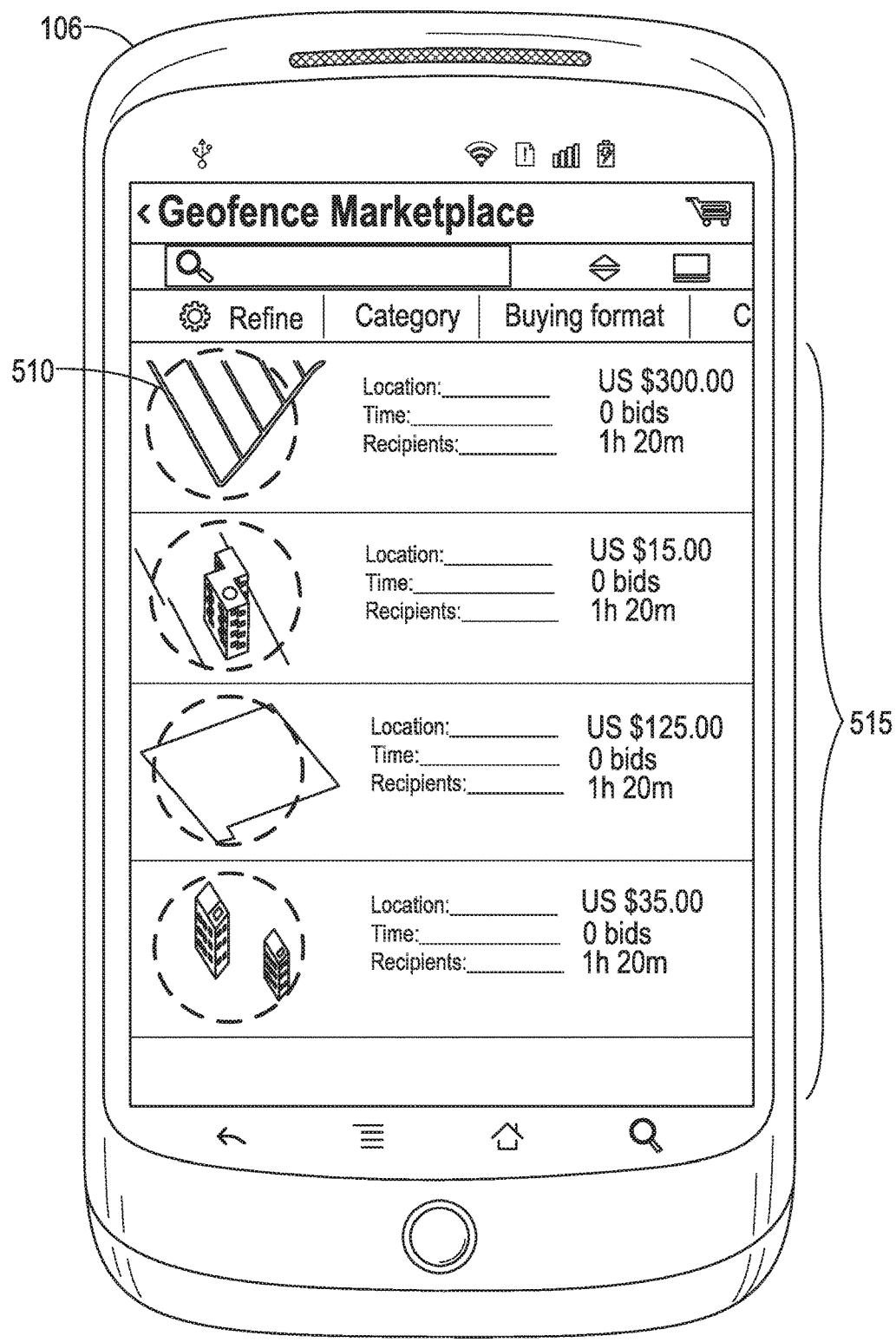
FIGS. 5A and 5B are interface diagrams representations of a geo-fence marketplace, consistent with some embodiments.

FIG. 5A is a screenshot illustrating a geo-fence marketplace displayed on a client device 106, consistent with some embodiments. One or more listings 515 for geo-fences may be published in a marketplace by the publication module 200. The listings 515 may include a name for identification purposes, location information, identifying the specific area covered by any given geo-fence, pricing information as generated by the pricing module 204, as well as information corresponding to demographic attributes. The listing for the geo-fence 510 includes: location information, identifying the geographic area 404 covered by the geo-fence 510; a corresponding initial price based on the geo-fence parameters, which include the size of the geo-fence, and the social action data corresponding to the geographic area 404; a period of time which the geo-fence services may be used; and a field to identify attributes corresponding to target recipients. For example, a user placing a bid on geo-fence 510 may schedule a time frame which they wish to utilize the geo-fence, and may then select attributes corresponding to the target recipients. The pricing module 204 may then calculate an initial cost for the geo-fence based on the geo-fence parameters selected by the user. The user may then place a bid through the auction module 202, or in some embodiments, pay a fixed price.

Figure 5B:
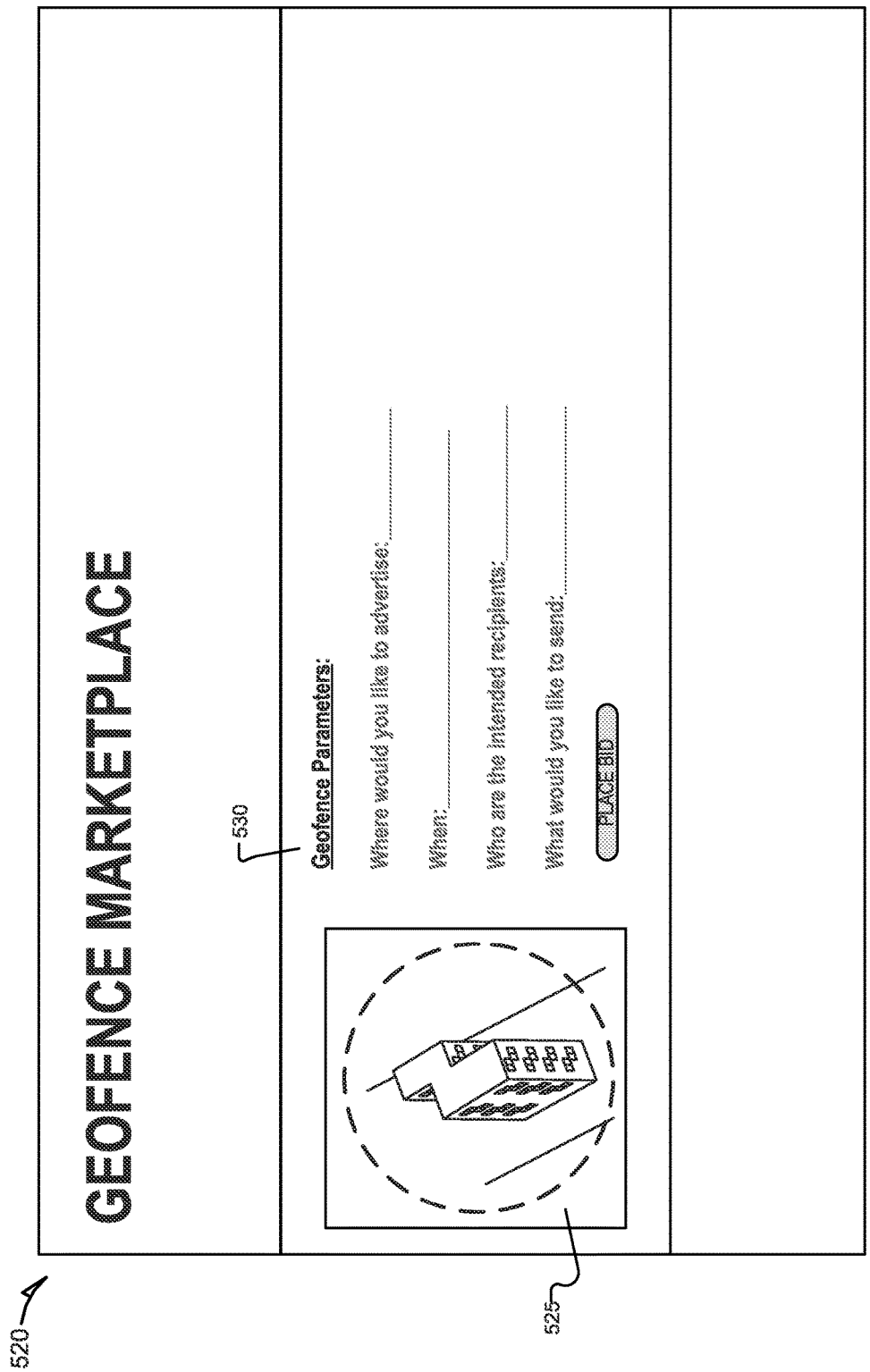

FIG. 5B is a screenshot illustrating an interactive user interface 520 whereby a user may provision geo-fences based upon user inputs specifying a particular geographic location and demographic information. The user may specify a geographic location, as well as demographic attributes corresponding to a desired group of recipients, and a scheduled time to use the geo-fencing service, through a list of geo-fence parameters 530. The demographic attributes include age, gender, a transaction history, a recipient's user profile information, and one or more social actions (e.g., a like, a tweet, a status update, a check-in, becoming a follower, pin an interest or the like) performed by the recipient and published as an entry on one or more social networks (e.g., Facebook®, Twitter®, Google+®, Pinterest®, Svpply®). The user may select a geographic area 404 by entering an address, cross streets, GPS coordinates, or keywords corresponding to user social actions. Responsive to defining a geographic area 404, the geo-fencing module 216 would then generate a corresponding geo-fence 525. The user may then place a bid on the geo-fence 525 through auction module 202.

Figure 6A:
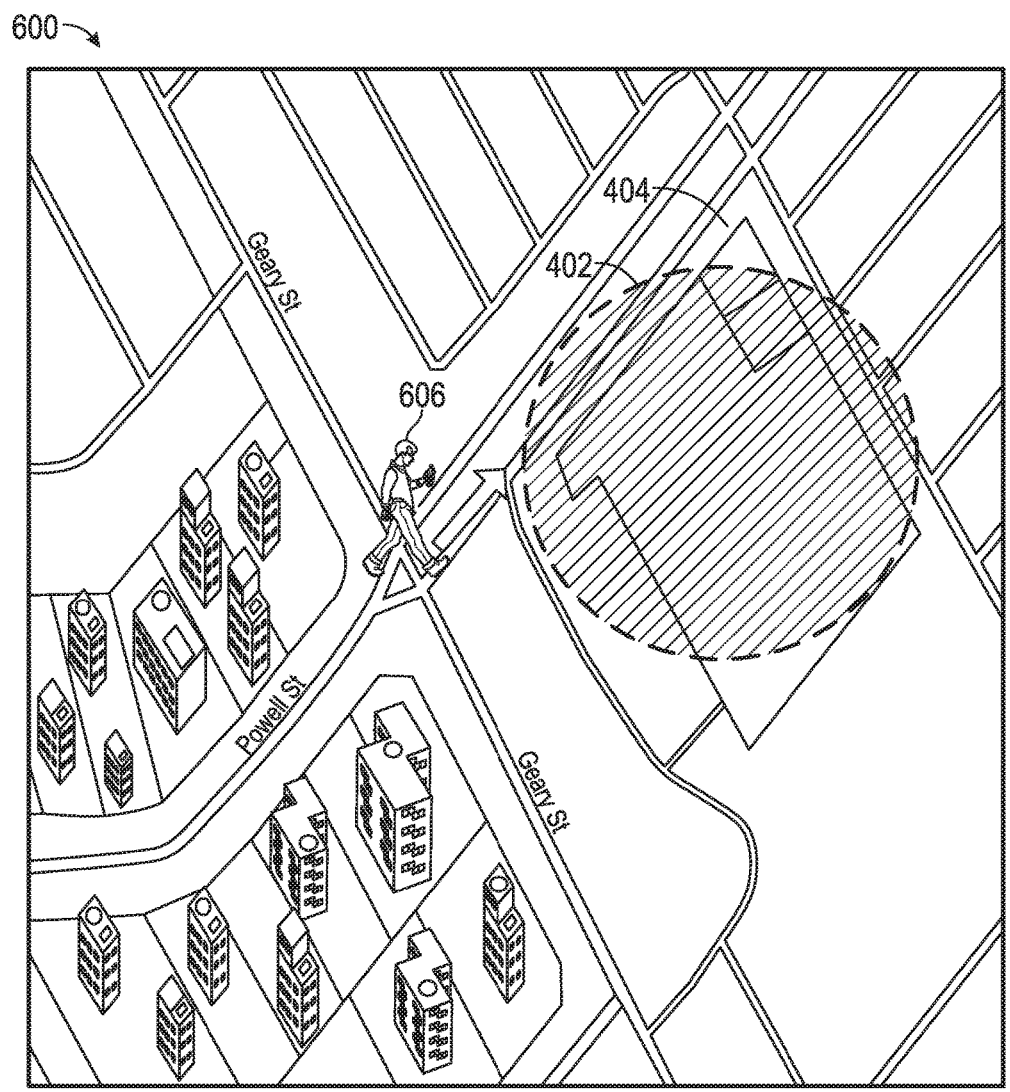
FIGS. 6A and 6B are diagrammatic representations of a geo-fence, consistent with some embodiments.
Figure 6B:
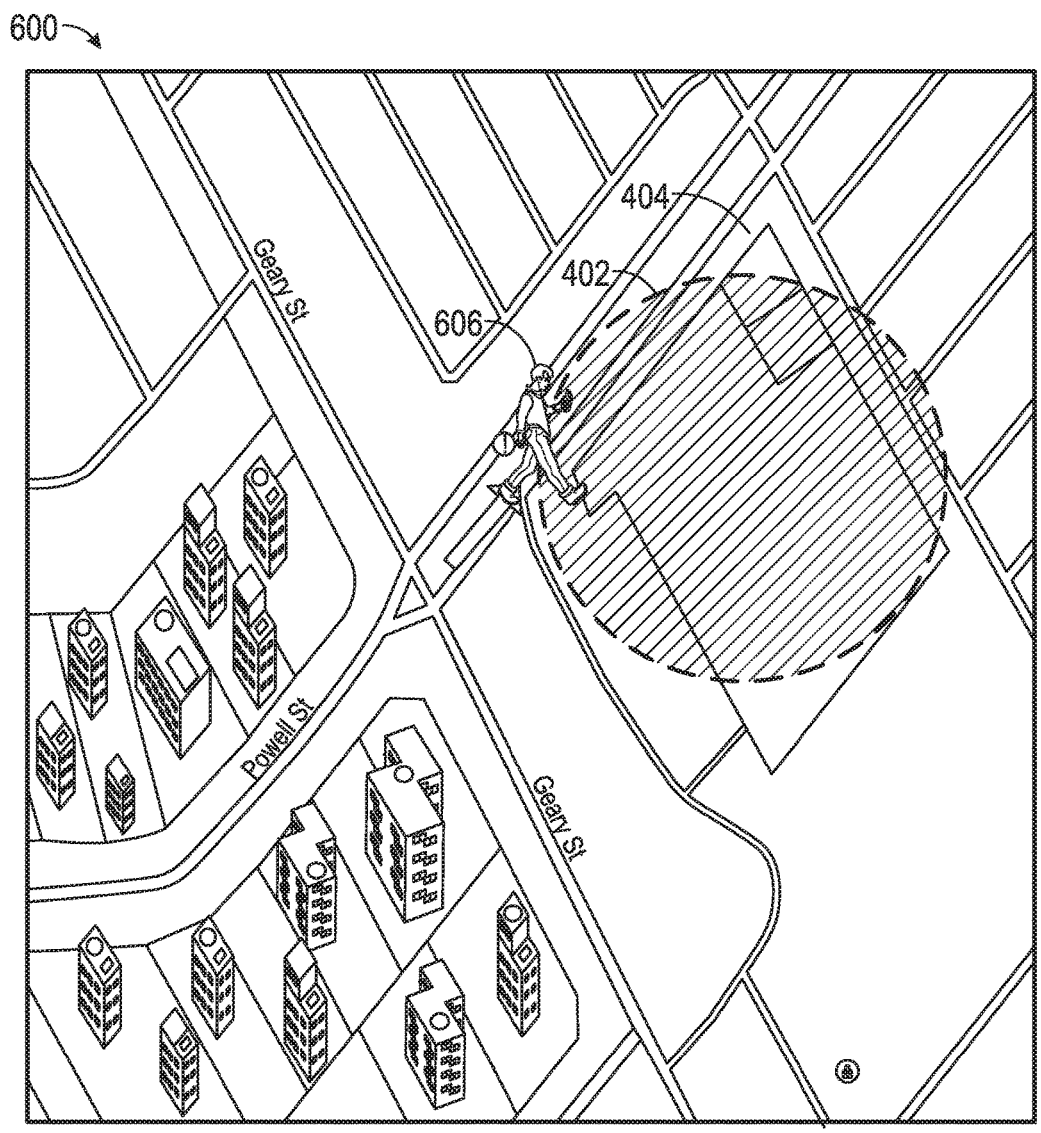

FIGS. 6A and 6B are diagrammatic representations of a geo-fence 402, corresponding to geographic area 404, consistent with some embodiments. The geographic area 404 corresponds to a geographic location identified by the user through the user interface of FIG. 5B, or a geographic location identified by the geo-fencing module 216. For example, the geographic area 404 may correspond to a hotel where a plurality of users may have checked in, or addressed through social actions on one or more social networks. The geo-fence 402 may be generated by the geo-fencing module 216 in response to identifying the geographic area 404. As illustrated in FIG. 6A, the user 606 is at a location outside of geo-fence 402. The user 606 may be carrying a client device 108. As illustrated in FIG. 6B, the user 606 may then enter the geo-fence 402. The geo-fencing module 216 may then detect that the user 606 has entered into the geo-fence 402 based on location information received from the client device 108. Responsive to the user 606 entering the geo-fence 402, the communications module 218 may deliver targeted content to client device 108.

Figure 7:
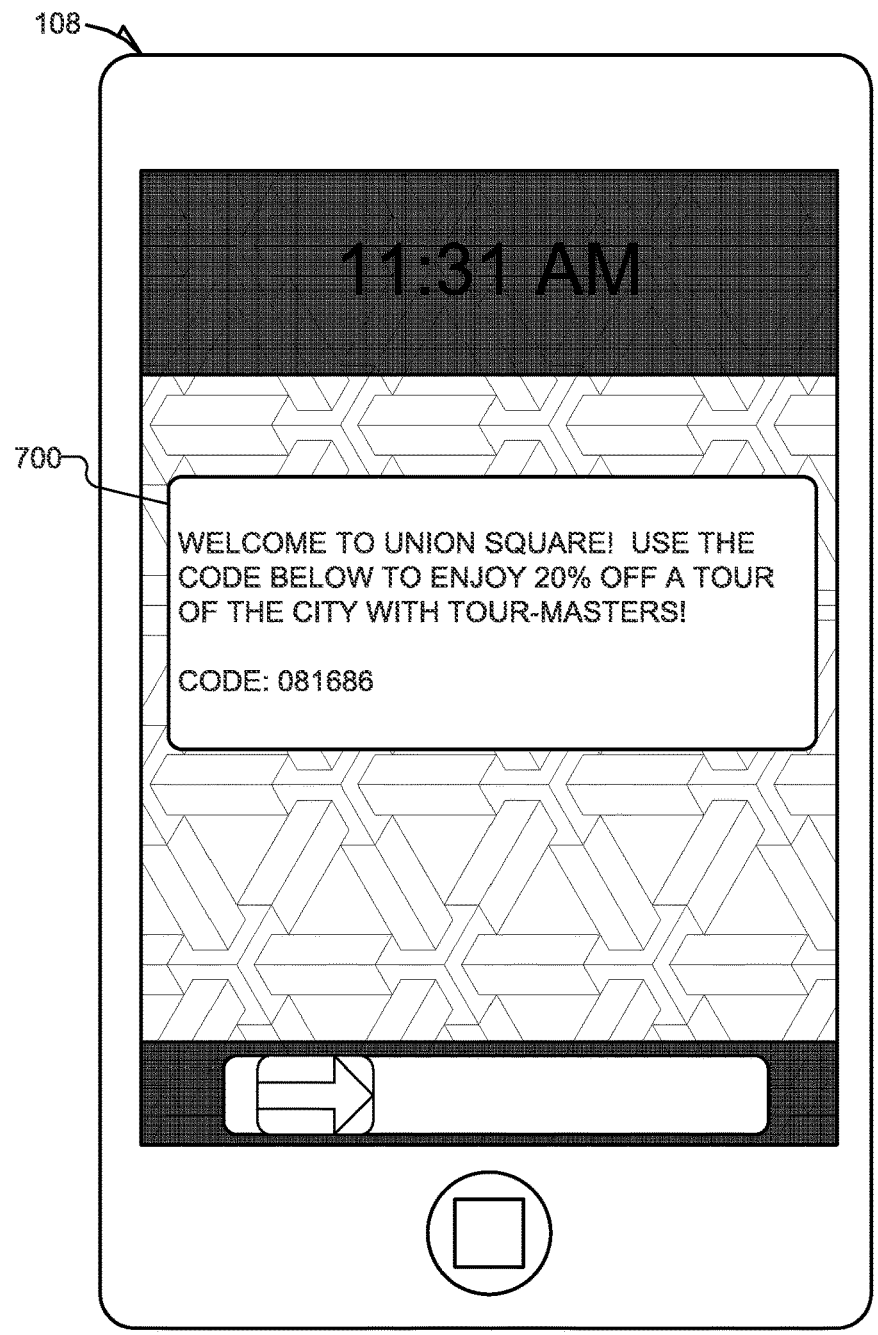
FIG. 7 is an interface diagram depicting a notification presented on a client device of a user, consistent with some embodiments.

FIG. 7 is an interface diagram depicting a notification presented on a client device 108 of a user 606, consistent with some embodiments. In particular, FIG. 7 illustrates a notification 700 displayed on the client device 108 of the user 606. The notification 700 may be transmitted to the client device 108 in response to detecting that the user 606 has entered the personalized geo-fence 402, as illustrated in FIG. 6B. It should be appreciated that the content of notification 700 is presented for illustrative purposes only, and in other embodiments, such notifications may include a variety of advertisements, coupons, rewards, or other incentives that may be applicable at a real-world location for which a geo-fence has been entered, or may applicable at an electronic marketplace hosted by application servers 124 or third party server 114. Further, in some embodiments, the particular varied coupons, rewards, or other incentives provided to a user 606 may be specifically tailored for the user 606 based on the user 606's preferences and other information about the user 606 maintained as part of a user profile. Also, although FIG. 7 illustrates a message being delivered by the communication module 218 via an applicable push notification service, the communication module 218 is, of course, not limited to such a delivery platform, and may, in other embodiment, utilize any one of a number of message delivery networks and platforms to deliver messages to the client devices 108 of users 606.

Figure 8:
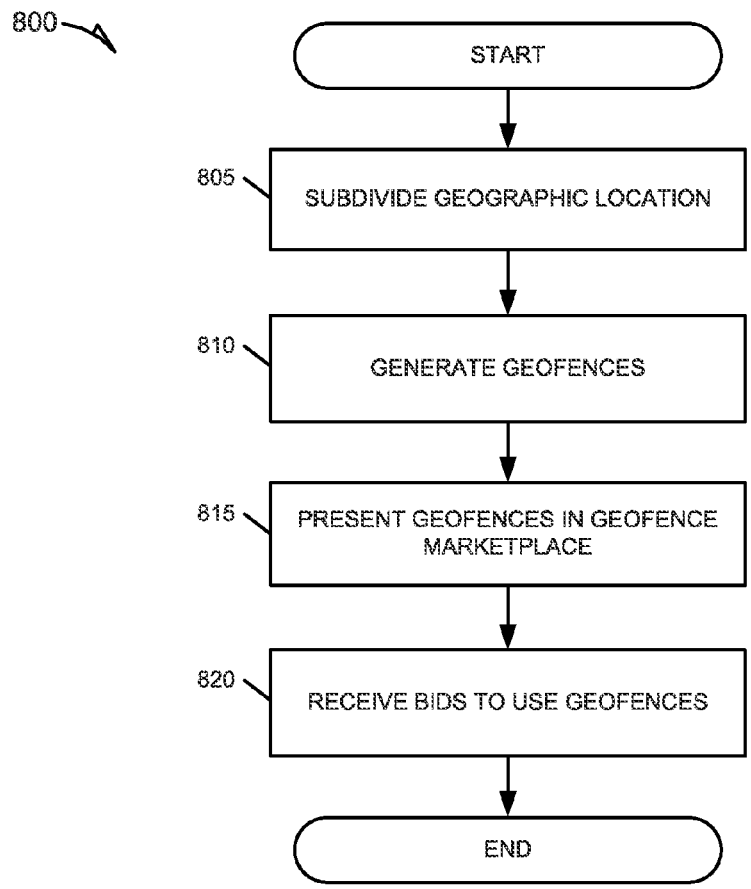
FIG. 8 is a flowchart illustrating an example method for generating and provisioning a geo-fence, and presenting the geo-fence in a marketplace, consistent with some embodiments.

FIG. 8 is a flowchart illustrating an example method 800 for generating geo-fences, and presenting the geo-fences as listings 515 in a geo-fence marketplace, consistent with some embodiments. The method 800 may be embodied in computer-readable instructions for execution by one or more processors 310 such that the steps of the method 800 may be performed by the application server 124 and, in particular, the modules 200-218 comprising the geo-fence marketplace application 126.

At operation 805, the geo-fencing module 216 may subdivide a geographic area 404 based on locations of businesses and landmarks distributed over the region. In other embodiments, the geo-fencing module 216 may obtain social network activity of a plurality of users 606 within a geographic region from one or more social networks, and subdivide a geographic area 404 based on concentrations of social actions identifying a geographic location (e.g., a like, a tweet, a status update, a check-in, becoming a follower, pin an interest or the like) performed by the user 606 and published as an entry on one or more social networks (e.g., Facebook®, Twitter®, Google+®, Pinterest®, Svpply®). The social network activity is analyzed to identify concentrations of check-in data, and social actions corresponding to a particular geographic location. At operations 810, geo-fences are generated by the geo-fencing module 216 corresponding to the geographic locations identified at operation 805.

Responsive to the geo-fencing module 216 identifying and generating geo-fences, at operation 815, the publication module 200 presents the geo-fences as listings 515 within a navigable marketplace. A user 606 may then navigate through the listings 515 in order to select an appropriate geo-fence. Upon selecting a geo-fence, a user 606 may then place a bid to use the geo-fence for a scheduled period of time. At operation 820, the auction module 202 receives bids from one or more users 606 to find a buyer.

Module, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 310 or a group of processors 310) may be configured by software (e.g., an application 340 or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a Field-Programmable Gate Array (FPGA) or an Application Specific Integrated Circuit (ASIC)) to perform certain operations. A hardware module may also comprise programmable logic or circuitry (e.g., as encompassed within a general-purpose processor 310 or other programmable processor 310) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware module need not be configured or instantiated at any one instance in time. For example, where the hardware modules comprise a general-purpose processor 310 configured using software, the general-purpose processor 310 may be configured as respective different hardware modules at different times. Software may accordingly configure a processor 310, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 310 that are temporarily configured (e.g., by software) or permanently configured to perform the relevant operations. Whether temporarily or permanently configured, such processors 310 may constitute processor-implemented modules that operate to perform one or more operations or functions. The module referred to herein may, in some example embodiments, comprise processor-implemented modules.

Similarly, the methods described herein may be at least partially processor-implemented. For example, at least some of the operations of a method may be performed by one or more processors 310 or processor-implemented modules. The performance of certain of the operations may be distributed among the one or more processors 310, not only residing within a single machine, but deployed across a number of machines. In some example embodiments, the processor or processors 310 may be located in a single location (e.g., within a home environment, an office environment, or as a server farm), while in other embodiments the processors 310 may be distributed across a number of locations.

The one or more processors 310 may also operate to support performance of the relevant operations in a "cloud computing" environment or as a "software as a service" (SaaS). For example, at least some of the operations may be performed by a group of computers (as examples of machines including processors 310), with these operations being accessible via a network 104 (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor 310, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network 104.

In example embodiments, operations may be performed by one or more programmable processors 310 executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 310), or a combination of permanently and temporarily configured hardware may be a design Choice. Below are set out hardware (e.g., machine) and software architectures that may be deployed, in various example embodiments.

Example Machine Architecture and Machine-Readable Medium

Figure 9:
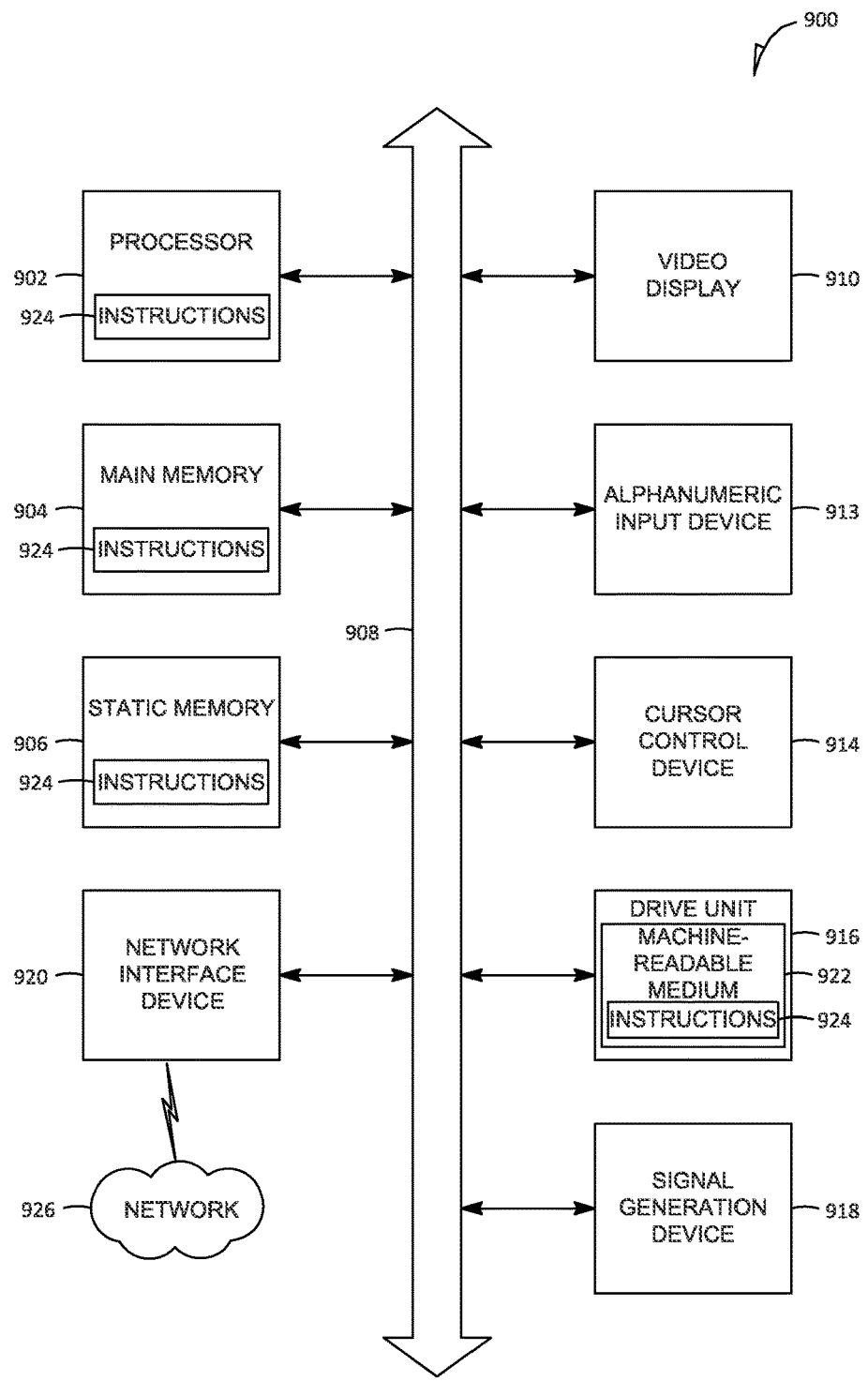
FIG. 9 is a diagrammatic representation of a machine in the example form of a computer system within which a set of instructions for causing the machine to perform any one or more of the methodologies discussed herein may be executed.

FIG. 9 is a block diagram of machine in the example form of a computer system 900, which may correspond to client device 106 or 108, third party server 114, or server 124, consistent with some embodiments. The computer system 900 may include instructions 924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 913 (e.g., a keyboard), a cursor control device 914 (e.g., a mouse), a drive unit 916, a signal generation device 918 (e.g., a speaker), and a network interface device 920.

Machine-Readable Medium

The drive unit 916 includes a machine-readable medium 922 on which is stored one or more sets of data structures and instructions 924 (e.g., software) embodying or used by any one or more of the methodologies or functions described herein. The instructions 924 may also reside, completely or at least partially, within the main memory 904, static memory 906, and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database 132, and/or associated caches and servers) that store the one or more data structures or instructions 924. The term "machine-readable medium" shall also be taken to include any tangible medium that is capable of storing, encoding, or carrying instructions (e.g., instructions 924) for execution by the machine and that cause the machine to perform any one or more of the methodologies of the present disclosure, or that is capable of storing, encoding or carrying data structures used by or associated with such instructions 924. The term "machine-readable medium" shall accordingly be taken to include, but not be limited to, solid-state memories, and optical and magnetic media. Specific examples of machine-readable media 922 include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium 922 is non-transitory in that it does not embody a propagating signal. However, labeling the tangible machine-readable medium 922 as "non-transitory" should not be construed to mean that the medium is incapable of movement—the medium should be considered as being transportable from one real-world location to another. Additionally, since the machine-readable medium 922 is tangible, the medium may be considered to be a machine-readable device.

Transmission Medium

The instructions 924 may further be transmitted or received over a communications network 926 using a transmission medium. The instructions 924 may be transmitted using the network interface device 920 and any one of a number of well-known transfer protocols, such as Hypertext Transfer Protocol (HTTP). Examples of communication networks 104 include a LAN, a WAN, the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The invention claimed is:

1. A system comprising:
a memory; and
at least one hardware processor coupled to the memory and comprising instructions that cause the system to perform operations comprising:
obtaining social network activity of a plurality of users, the social network activity of the plurality of users comprising location data that identifies geographic locations of the plurality of users;
identifying concentrations of social network activity within a geographic region based on the location data that identifies the geographic locations of the plurality of users, each of the concentrations of social network activity comprising a number of users;
subdividing the geographic region into one or more geographic areas based on the concentrations of social network activity, each of the one or more geographic areas associated with a corresponding number of users based on the concentrations of social network activity;
generating at least a geo-fence that encompasses a geographic area from among the one or more geographic areas;
determining a cost for delivering targeted content through the geo-fence, the cost based on the number of users associated with the corresponding geographic area; and
displaying an interface that comprises a presentation of a listing that identifies the geo-fence and comprises a display of the cost for delivering the targeted content through the geo-fence.

2. The system of claim 1, wherein the instructions cause the system to perform operations further comprising receiving a bid for the geo-fence via the interface.

3. The system of claim 1 wherein the instructions cause the system to perform operations further comprising:
detecting a user device within the geo-fence; and
delivering the targeted content to the user device in response to detecting the user-device within the geo-fence.

4. The system of claim 3, wherein the detecting the user device within the geo-fence includes:
receiving geo-location data from the user device, the geo-location data identifying the geographic location; and
determining that the user device is within the geo-fence based on the geo-location data.

5. The system of claim 3, wherein the detecting the user device within the geo-fence includes:
receiving a notification from the user device, wherein the notification is a check-in request that identifies the geographic location.

6. The system of claim 3, wherein the delivering the targeted content to the user device includes:
transmitting the targeted content to the user device via a push notification.

7. The system of claim 1, wherein the displaying the interface that includes the listing further comprises:
causing display of the listing among a set of listings, the set of listings corresponding to a set of geo-fences.

8. The system of claim 1, wherein the determining the cost is based on the concentration of the social network activity and a geo-fence parameter that includes a size of the geo-fence.

9. A method comprising:
obtaining social network activity of a plurality of users, the social network activity of the plurality of users comprising location data that identifies geographic locations of the plurality of users;
identifying concentrations of social network activity within a geographic region based on the location data that identifies the geographic locations of the plurality of users, each of the concentrations of social network activity comprising a number of users;
subdividing the geographic region into one or more geographic areas based on the concentrations of social network activity, each of the one or more geographic areas associated with a corresponding number of users based on the concentrations of social network activity;
generating at least a geo-fence that encompasses a geographic area from among the one or more geographic areas;
determining a cost for delivering targeted content through the geo-fence, the cost based on the number of users associated with the corresponding geographic area; and
displaying an interface that comprises a presentation of a listing that identifies the geo-fence and comprises a display of the cost for delivering the targeted content through the geo-fence.

10. The method of claim 9 further comprising:
receiving a bid for the geo-fence via the interactive user-interface.

11. The method of claim 10 wherein the determining the price is based on the concentration and geo-fence parameters, the geo-fence parameters including:
a defined period of time for delivery of the targeted content;
a size of the geo-fence; and
one or more identifiers corresponding to the detected user device or an identity of a user, the identifiers being based on demographic information and a transaction history.

12. The method of claim 11 wherein the demographic information includes user profile information, a user gender, or a user age.

13. The method of claim 9, further comprising:
detecting a user device within the geo-fence; and
responsive to detecting the user device of the recipient entering into the geo-fence, delivering the targeted content to the user device.

14. The method of claim 13, wherein the detecting the user device within the geo-fence comprises:
receiving geo-location data from the user device, the geo-location data identifying the geographic location; and
determining that the user device is within the geographic region corresponding to the geo-fence based on the geo-location data.

15. The method of claim 9 wherein an initial cost for the geo-fence increases with respect to a size associated with the corresponding geographic region.

16. The method of claim 9 wherein the targeted content is an advertisement.

17. The method of claim 9 wherein the targeted content is delivered via a push notification.

18. A non-transitory machine-readable storage medium embodying instructions executed by a machine, that cause the machine to perform operations comprising:

obtaining social network activity of a plurality of users, the social network activity of the plurality of users comprising location data that identifies geographic locations of the plurality of users;

identifying concentrations of social network activity within a geographic region based on the location data that identifies the geographic locations of the plurality of users, each of the concentrations of social network activity comprising a number of users;

subdividing the geographic region into one or more geographic areas based on the concentrations of social network activity, each of the one or more geographic areas associated with a corresponding number of users based on the concentrations of social network activity;

generating at least a geo-fence that encompasses a geographic area from among the one or more geographic areas;

determining a cost for delivering targeted content through the geo-fence, the cost based on the number of users associated with the corresponding geographic area; and displaying an interface that comprises a presentation of a listing that identifies the geo-fence and comprises a display of the cost for delivering the targeted content through the geo-fence.

19. The non-transitory machine-readable storage medium embodying instructions executed by the machine, that cause the machine to perform the operations of claim 18, further comprising:

detecting a user device has entered into the geographic region corresponding to the geo-fence; and responsive to detecting the user device entering into the geographic region, delivering the targeted content to the user device.

20. The non-transitory machine-readable storage medium embodying instructions executed by the machine, that cause the machine to perform the operations of claim 18, further comprising:

presenting the listing that identifies the geo-fence among a set of listings that identify a set of geo-fences.

\* \* \* \* \*